United States Patent
Koh et al.

US009156930B2

(10) Patent No.: US 9,156,930 B2
(45) Date of Patent: Oct. 13, 2015

(54) FILM FOR USE IN FILM CAPACITORS, AND FILM CAPACITORS

(75) Inventors: Meiten Koh, Settsu (JP); Eri Mukai, Settsu (JP); Nobuyuki Komatsu, Settsu (JP); Kouji Yokotani, Settsu (JP); Mayuko Tatemichi, Settsu (JP); Kakeru Hanabusa, Settsu (JP); Takahiro Kitahara, Settsu (JP); Takuma Kawabe, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/825,476

(22) PCT Filed: Sep. 21, 2011

(86) PCT No.: PCT/JP2011/071483
§ 371 (c)(1),
(2), (4) Date: Mar. 21, 2013

(87) PCT Pub. No.: WO2012/039424
PCT Pub. Date: Mar. 29, 2012

(65) Prior Publication Data
US 2013/0188293 A1 Jul. 25, 2013

(30) Foreign Application Priority Data
Sep. 22, 2010 (JP) .................................. 2010-212812

(51) Int. Cl.
| C08F 14/26 | (2006.01) |
| C08F 214/26 | (2006.01) |
| C08L 27/18 | (2006.01) |
| H01G 4/18 | (2006.01) |
| H01G 4/20 | (2006.01) |
| H01G 4/33 | (2006.01) |
| C08J 5/18 | (2006.01) |
| C08K 3/22 | (2006.01) |

(52) U.S. Cl.
CPC .............. *C08F 214/26* (2013.01); *C08F 14/26* (2013.01); *C08F 214/262* (2013.01); *C08J 5/18* (2013.01); *C08L 27/18* (2013.01); *H01G 4/18* (2013.01); *H01G 4/20* (2013.01); *H01G 4/33* (2013.01); *C08J 2327/18* (2013.01); *C08K 3/22* (2013.01)

(58) Field of Classification Search
USPC .................................................. 526/255, 253
See application file for complete search history.

(56) References Cited

U.S. PATENT DOCUMENTS

| 4,546,141 | A | 10/1985 | Gebauer |
| 5,856,417 | A * | 1/1999 | Takakura et al. ............. 526/247 |
| 2003/0158310 | A1 | 8/2003 | Asano et al. |

| 2003/0181572 | A1 | 9/2003 | Tan et al. |
| 2009/0306264 | A1 * | 12/2009 | Koh et al. ...................... 524/413 |
| 2010/0110609 | A1 * | 5/2010 | Koh et al. ...................... 361/323 |
| 2010/0202100 | A1 * | 8/2010 | Koh et al. ...................... 361/323 |
| 2011/0013343 | A1 | 1/2011 | Koh et al. |
| 2011/0255210 | A1 * | 10/2011 | Tatemichi et al. ............ 361/311 |
| 2012/0293909 | A1 * | 11/2012 | Tatemichi et al. ......... 361/301.4 |

FOREIGN PATENT DOCUMENTS

| DE | 3832828 | A1 | 4/1990 |
| EP | 1553604 | A1 | 7/2005 |
| EP | 2676973 | A1 | 12/2013 |
| JP | 59-226410 | A | 12/1984 |
| JP | 60-199046 | A | 10/1985 |
| JP | 64-009261 | * | 1/1989 |
| JP | 64-9261 | A | 1/1989 |
| JP | 8-295776 | A | 11/1996 |
| JP | 2000-182436 | A | 6/2000 |
| JP | 2009-38088 | A | 2/2009 |
| JP | 2009-38089 | A | 2/2009 |
| WO | 2007088924 | A1 | 8/2007 |
| WO | 2008050971 | A1 | 5/2008 |
| WO | 2008/090947 | A1 | 7/2008 |
| WO | WO-2008/090947 | A1 * | 7/2008 |
| WO | 2009017109 | A1 | 2/2009 |
| WO | 2009/116527 | A1 | 9/2009 |

OTHER PUBLICATIONS

International Preliminary Report on Patentability for PCT Appln. No. PCT/JP2011/071483, together with the Written Opinion of the International Searching Authority.

International Search Report of PCT/JP2011/071483, dated Nov. 29, 2011.

Extended European Search Report dated Mar. 4, 2015 from the European Patent Office in corresponding European Application No. 11826869.7.

Database WPI, Week 198506, Thomson Scientific, London, GB; AN 1985-033678, XP002732768.

Database CA [Online] Chemical Abstracts Service, Columbus, Ohio, US; MIWA, Tetsuya et al:"Peroxide-vulcanizable fluoro rubber X 1,2,6 compositions", XP002732769, retrieved from STN Database accession No. 1997:101050.

* cited by examiner

Primary Examiner — Peter D Mulcahy
Assistant Examiner — Henry Hu
(74) Attorney, Agent, or Firm — Sughrue Mion, PLLC

(57) ABSTRACT

Provided is a film for a film capacitor in which electrical insulation, and especially electrical properties at high temperatures are improved while a high dielectric constant of a vinylidene fluoride resin is maintained. The film for a film capacitor includes a tetrafluoroethylene resin (a1) that includes a vinylidene fluoride unit and a tetrafluoroethylene unit in the vinylidene fluoride unit/tetrafluoroethylene unit ratio (mol %) of 0/100 to 49/51 as a film-forming resin (A).

10 Claims, No Drawings

FILM FOR USE IN FILM CAPACITORS, AND FILM CAPACITORS

CROSS REFERENCE TO RELATED APPLICATIONS

This is a National Stage of International Application No. PCT/JP2011/071483 filed Sep. 21, 2011, claiming priority based on Japanese Patent Application No. 2010-212812 filed Sep. 22, 2010, the contents of all of which are incorporated herein by reference in their entirety.

TECHNICAL FIELD

The present invention relates to a film for a film capacitor and a film capacitor which have high dielectric properties and electrical insulation, and especially improved electrical properties at high temperatures.

BACKGROUND ART

Conventionally, it has been proposed to use a vinylidene fluoride (VDF) resin (a homopolymer or a copolymer) as a film-forming resin in terms of its high dielectric constant, in films for film capacitors (Patent Literatures 1 and 2). Further, it is known to blend various kinds of high dielectric composite oxide particles in order to achieve higher dielectric properties. (Patent Literatures 3 to 6).

It is also known to blend a small amount (0.01 to 10 parts by mass based on 100 parts by mass of a VDF resin) of silica as a process improver in addition to high dielectric composite oxide particles (Patent Literature 7).

CITATION LIST

Patent Literature

Patent Literature 1: JP-A 60-199046
Patent Literature 2: WO 2008/090947
Patent Literature 3: WO 2007/088924
Patent Literature 4: WO 2009/017109
Patent Literature 5: JP-A 2009-38088
Patent Literature 6: JP-A 2009-38089
Patent Literature 7: WO 2008/050971

SUMMARY OF INVENTION

Technical Problem

A VDF resin used for such films for a film capacitor includes a large amount of VDF units because of the advantage of high dielectric properties of the VDF resin. However, the present inventors have been noticed that it is necessary to further improve electrical insulation, and especially electrical properties at high temperatures, and have examined improvement of a VDF resin itself. Thus, the present invention has been completed.

The present invention aims to provide a film for a film capacitor in which electrical insulation, and especially electrical properties at high temperatures are improved while a high dielectric constant of a VDF resin is maintained.

Solution to Problem

The present invention relates to a film for a film capacitor comprising a tetrafluoroethylene resin (a1) that includes a vinylidene fluoride (VDF) unit and a tetrafluoroethylene (TFE) unit in the VDF unit/TFE unit (mol % ratio) of 0/100 to 49/51 as a film-forming resin (A).

The TFE resin (a1) may further include an ethylenically unsaturated monomeric unit.

Preferable examples of the TFE resin (a1) include
a TFE-VDF resin (a1-1) that includes 55.0 to 90.0 mol % of the TFE unit, 5.0 to 44.9 mol % of the VDF unit, and 0.1 to 10.0 mol % of the ethylenically unsaturated monomeric unit represented by the formula (1):

$$CX^1X^2\!\!=\!\!CX^3(CF_2)_nX^4$$

wherein $X^1$, $X^2$, $X^3$, and $X^4$ are the same as or different from one another, and are each represent H, F, or Cl; and n is an integer of 0 to 8, provided that compounds of the formula (1) are neither TFE nor VDF;
a TFE-VDF resin (a1-2) that includes 55.0 to 90.0 mol % of the TFE unit, 9.2 to 44.2 mol % of the VDF unit, and 0.1 to 0.8 mol % of the ethylenically unsaturated monomeric unit represented by the formula (2):

$$CF_2\!\!=\!\!CF\!\!-\!\!ORf^1$$

wherein $Rf^1$ is a C1-C3 alkyl group or a C1-C3 fluoroalkyl group; and
a TFE-VDF resin (a1-3) that includes 55.0 to 90.0 mol % of the TFE unit; 5.0 to 44.8 mol % of the VDF unit; 0.1 to 10.0 mol % of the ethylenically unsaturated monomeric unit represented by the formula (1):

$$CX^1X^2\!\!=\!\!CX^3(CF_2)_nX^4$$

wherein $X^1$, $X^2$, $X^3$, and $X^4$ are the same as or different from one another, and are each represent H, F, or Cl; and n is an integer of 0 to 8, provided that compounds of the formula (1) are neither TFE nor VDF; and 0.1 to 0.8 mol % of the ethylenically unsaturated monomeric unit represented by the formula (2): $CF_2\!\!=\!\!CF\!\!-\!\!ORf^1$
wherein $Rf^1$ is a C1-C3 alkyl group or a C1-C3 fluoroalkyl group.

The TFE resin (a1) preferably has a storage modulus (E') of 60 to 400 MPa at 170° C. determined by dynamic viscoelasticity measurement.

The film-forming resin (A) may include the TFE resin (a1) and a fluorine-free resin (a2).

The fluorine-free resin (a2) is preferably at least one selected from the group consisting of cellulose resins and acrylic resins.

The film for a film capacitor of the present invention may further include inorganic oxide particles (B).

The inorganic oxide particles (B) preferably include at least (B1) inorganic oxide particles of one of metal elements belonging to groups 2, 3, 4, 12, and 13 of the periodic table or inorganic oxide composite particles of the metal elements. The inorganic oxide particles or the inorganic oxide composite particles (B1) are preferably at least one type of particles selected from the group consisting of $Al_2O_3$, MgO, $ZrO_2$, $Y_2O_3$, BeO, and $MgO\cdot Al_2O_3$. Particularly, $\gamma\text{-}Al_2O_3$ is preferable.

Further, the inorganic oxide particles (B) may include at least one type of high dielectric inorganic particles selected from the group consisting of composite oxide particles (B2) to (B5), provided that the high dielectric inorganic particles are neither the inorganic oxide particle nor the inorganic oxide composite particles (B1), each of the composite oxide particles (B2) being represented by the formula (B2):

$$M^1{}_{a1}N_{b1}O_{c1}$$

wherein $M^1$ is a metal element belonging to group 2 of the periodic table, N is a metal element belonging to group 4 of the periodic table, a1 is 0.9 to 1.1; b1 is 0.9 to 1.1, c1 is 2.8 to 3.2, and $M^1$ and N may be plural;

each of the composite oxide particles (B3) being represented by the formula (B3):

$$M^2{}_{a2}M^3{}_{b2}O_{c2}$$

wherein $M^2$ and $M^3$ are different from each other, $M^2$ is a metal element belonging to group 2 of the periodic table, $M^3$ is a metal element belonging to group 5 of the periodic table, a2 is 0.9 to 1.1, b2 is 0.9 to 1.1, and c2 is 2.8 to 3.2;

the composite oxide particle (B4) including at least three metal elements selected from the group consisting of metal elements belonging to groups 2 and 4 of the periodic table; and the inorganic oxide composite particle (B5) being a particle of an oxide of one of metal elements belonging to groups 2, 3, 4, 12, and 13 of the periodic table and a silicon oxide.

The film for a film capacitor of the present invention may be produced by extrusion.

The present invention also relates to a film capacitor that includes the film for a film capacitor of the present invention, and an electrode layer disposed on at least one surface of the film for a film capacitor.

Advantageous Effects of Invention

The film for a film capacitor of the present invention can improve electrical insulation, and especially electrical properties at high temperatures while a high dielectric constant is maintained.

DESCRIPTION OF EMBODIMENT

The film for a film capacitor of the present invention includes a TFE resin (a1) that includes a VDF unit and a TFE unit in the VDF unit/TFE unit (mol % ratio) of 0/100 to 49/51 as a film-forming resin (A).

Components will be described below.
(A) Film-forming Resin

The film-forming resin (A) includes a TFE resin (a1) that includes a VDF unit and a TFE unit in the VDF unit/TFE unit (mol % ratio) of 0/100 to 49/51.

The TFE resin (a1) used in the present invention includes a large amount of the TFE unit, so that it has a high melting point and especially improved electrical properties at high temperatures. Therefore, a film can be produced by extrusion.

The TFE resin (a1) may be a TFE homopolymer (100 mol % of TFE unit), and preferably includes 5 mol % or more and 40 mol % or less of the VDF unit based on the total amount of the VDF unit and the TFE unit in terms of efficient use of the high dielectric properties of VDF.

The TFE resin (a1) may further include an ethylenically unsaturated monomeric unit, specifically an ethylenically unsaturated monomeric unit represented by the formula (1):

$$CX^1X^2=CX^3(CF_2)_nX^4$$

wherein $X^1$, $X^2$, $X^3$, and $X^4$ are the same as or different from one another, and are each represent H, F, or Cl; and n is an integer of 0 to 8, provided that compounds of the formula (1) are neither TFE nor VDF; and/or an ethylenically unsaturated monomeric unit represented by the formula (2):

$$CF_2=CF-ORf^1$$

wherein $Rf^1$ is a C1-C3 alkyl group or a C1-C3 fluoroalkyl group.

For example, the ethylenically unsaturated monomer represented by the formula (1) is preferably at least one selected from the group consisting of $CF_2=CFCl$; $CF_2=CFCF_2CF_3$; monomers represented by the formula (3):

$$CH_2=CF-(CF_2)_nX^4$$

wherein $X^4$ and n are the same as those in the formula (1); and monomers represented by the formula (4):

$$CH_2=CH-(CF_2)_nX^4$$

wherein $X^4$ and n are the same as those in the formula (1), in terms of obtaining good mechanical strength of the TFE resin.

Among these, $CF_2=CFCl$, $CH_2=CFCF_3$, $CH_2=CH-C_4F_9$, $CH_2=CH-C_6F_{13}$, $CH_2=CF-C_3F_7$, $CF_2=CFCF_3$, $CH_2=CF-C_3F_6H$, and the like are preferable in terms of obtaining good mechanical strength of the TFE resin. Especially, the ethylenically unsaturated monomer is preferably at least one selected from the group consisting of $CF_2=CFCl$, $CH_2=CFCF_3$, $CH_2=CH-C_4F_9$, $CH_2=CH-C_6F_{13}$, and $CH_2=CF-C_3F_6H$ in terms of obtaining good mechanical strength at high temperatures.

For example, the ethylenically unsaturated monomer represented by the formula (2) is preferably at least one selected from the group consisting of $CF_2=CF-OCF_3$, $CF_2=CF-OCF_2CF_3$, and $CF_2=CF-OCF_2CF_2CF_3$ in terms of obtaining good mechanical strength of the TFE resin at high temperatures.

The TFE-VDF resin (a1-1) including the ethylenically unsaturated monomeric unit (1) represented by the formula (1) may be a copolymer that includes 55.0 to 90.0 mol % of the TFE unit, 5.0 to 44.9 mol % of the VDF unit, and 0.1 to 10.0 mol % of the ethylenically unsaturated monomeric unit (1).

The TFE-VDF resin (a1-1) may preferably be a copolymer that includes 55.0 to 85.0 mol % of the TFE unit, 10.0 to 44.9 mol % of the VDF unit, and 0.1 to 5.0 mol % of the ethylenically unsaturated monomeric unit (1), and further may be a copolymer that includes 55.0 to 85.0 mol % of the TFE unit, 13.0 to 44.9 mol % of the VDF unit, and 0.1 to 2.0 mol % of the ethylenically unsaturated monomeric unit (1), in terms of obtaining good mechanical strength at high temperatures.

Since the mechanical strength of the TFE-VDF resin at high temperatures is good, the TFE-VDF resin (a1-1) may preferably be a copolymer that includes 55.0 to 80.0 mol % of the TFE unit, 19.5 to 44.9 mol % of the VDF unit, and 0.1 to 0.6 mol % of the ethylenically unsaturated monomeric unit (1) that is at least one selected from the group consisting of $CH_2=CH-C_4F_9$, $CH_2=CH-C_6F_{13}$, and $CH_2=CF-C_3F_6H$.

The TFE-VDF resin (a1-2) including the ethylenically unsaturated monomeric unit (2) represented by the formula (2) is preferably a copolymer that includes 55.0 to 90.0 mol % of the TFE unit, 9.2 to 44.2 mol % of the VDF unit, and 0.1 to 0.8 mol % of the ethylenically unsaturated monomeric unit (2), in terms of obtaining good mechanical strength at high temperatures.

The TFE-VDF resin (a1-2) is more preferably a copolymer including 58.0 to 85.0 mol % of the TFE unit, 14.5 to 39.9 mol % of the VDF unit, and 0.1 to 0.5 mol % of the ethylenically unsaturated monomeric unit (2), in terms of obtaining good mechanical strength at high temperatures.

The TFE-VDF resin (a1-3) including both the ethylenically unsaturated monomeric units (1) and (2) is preferably a copolymer that includes 55.0 to 90.0 mol % of the TFE unit, 5.0 to 44.8 mol % of the VDF unit, 0.1 to 10.0 mol % of the ethylenically unsaturated monomeric unit (1), and 0.1 to 0.8 mol % of the ethylenically unsaturated monomeric unit (2), in terms of obtaining good mechanical strength at high temperatures.

The TFE-VDF resin (a1-3) is more preferably a copolymer including 55.0 to 85.0 mol % of the TFE unit, 9.5 to 44.8 mol % of the VDF unit, 0.1 to 5.0 mol % of the ethylenically unsaturated monomeric unit (1), and 0.1 to 0.5 mol % of the ethylenically unsaturated monomeric unit (2), in terms of obtaining good mechanical strength. Further, the TFE-VDF resin (a1-3) may be a copolymer including 55.0 to 80.0 mol % of the TFE unit, 19.8 to 44.8 mol % of the VDF unit, 0.1 to 2.0 mol % of the ethylenically unsaturated monomeric unit (1), and 0.1 to 0.3 mol % of the ethylenically unsaturated monomeric unit (2), in terms of obtaining good mechanical strength at high temperatures. Further, the TFE-VDF resin (a1-3) may be preferably a copolymer including 58.0 to 85.0 mol % of the TFE unit, 9.5 to 39.8 mol % of the VDF unit, 0.1 to 5.0 mol % of the ethylenically unsaturated monomeric unit (1), and 0.1 to 0.5 mol % of the ethylenically unsaturated monomeric unit (2), in terms of obtaining good mechanical strength at high temperatures.

The TFE resin (a1) used in the present invention preferably has a storage modulus (E') of 60 to 400 MPa at 170° C. determined by dynamic viscoelasticity measurement. The storage modulus (E') of 60 to 400 MPa provides preferable mechanical strength. The storage modulus (E') is preferably 80 to 350 MPa and more preferably 100 to 350 MPa in terms of favorable processability into a film.

The storage modulus (E') in the present invention is a value determined by dynamic viscoelasticity measurement at 170° C. Specifically, the storage modulus is a value determined by analysis of a sample with a length of 30 mm, a width of 5 mm, and a thickness of 0.25 mm by a dynamic viscoelasticity analyzer DVA 220 (IT keisoku seigyo K. K.) in a tensile mode using a supporting span of 20 mm at a temperature increase rate of 2° C./rain from 25° C. to 250° C. at a frequency of 1 Hz.

The TFE resin (a1) used in the present invention preferably has a melt flow rate (MFR) of 0.1 to 50 g/10 min in terms of favorable processability into a film.

The MFR is defined as the mass (g/10 min) of a polymer flowing out from a nozzle (inner diameter: 2 mm, length: 8 mm) for 10 minutes at 297° C. under a load of 5 kg which is measured using Melt Indexer (Toyo Seiki Seisaku-sho, Ltd.) in accordance with ASTM D3307-1.

The TFE resin (a1) used in the present invention preferably has a melting point of 180° C. or higher. Such a high melting point improves electrical properties at high temperatures, especially improves dielectric characteristics. The melting point is more preferably 200° C. or higher. The maximum melting point is preferably 300° C., more preferably 250° C., and particularly preferably 220° C. in terms of processability.

The melting point is defined as the peak temperature of an endothermic curve that is obtained by a thermal measurement at a temperature increase rate of 10° C./min in 2nd run using a differential scanning calorimeter RDC 220 (Seiko Instruments Inc.) in accordance with ASTM D-4591.

The TFE resin (a1) used in the present invention preferably has a thermal decomposition onset temperature (1% mass loss temperature) of 360° C. or higher. The thermal decomposition onset temperature is preferably 370° C. or higher, and may be about 470° C. The maximum thermal decomposition onset temperature is not particularly limited.

The thermal decomposition onset temperature is defined as the temperature at which 1% by mass of a TFE resin under a heating test is decomposed, and is measured using a thermogravimetric/differential thermal analyzer (TG-DTA).

The TFE resin (a1) used in the present invention may be produced by known methods including solution polymerization, bulk polymerization, emulsion polymerization, and suspension polymerization, under known polymerization conditions.

In the present invention, the film-forming resin (A) may include a fluorine-free resin (a2) in addition to the TFE resin (a1).

Such a fluorine-free resin (a2) is preferably a cellulose resin and/or an acrylic resin in terms of good compatibility with the TFE resin.

Use of the fluorine-free resin (a2) together with the TFE resin (a1) allows for a reduction in temperature dependency of the dielectric loss of the TFE resin (a1) and especially a reduction in temperature dependency at high temperatures.

Examples of the cellulose resin include ester-substituted celluloses such as cellulose monoacetate, cellulose diacetate, cellulose triacetate, cellulose acetate propionate and cellulose acetate butyrate; ether-substituted celluloses such as methyl cellulose, ethyl cellulose, and hydroxypropyl methylcellulose. Among these, cellulose acetate propionate and cellulose acetate butyrate are preferable in terms of good compatibility with the TFE resin.

Examples of the acrylic resin include polymethyl methacrylate and a styrene-methylmethacrylate copolymer. Particularly, polymethyl methacrylate is preferable in terms of good compatibility with the TFE resin.

In the case that the fluorine-free resin (a2) is used together with the TFE resin (a1), the mass ratio of the TFE resin (a1) to the fluorine-free resin (a2) is preferably 90/10 to 99.9/0.1 and more preferably 95/5 to 98/2 in terms of a high dielectric constant and low temperature dependency of a dielectric loss at a frequency of Hz order.

The film for a film capacitor of the present invention may further include inorganic oxide particles (B).

The inorganic oxide particles (B) of the present invention are preferably the following inorganic oxide particles (B1).

(B1) Inorganic oxide particles of one of metal elements belonging to groups 2, 3, 4, 12, and 13 of the periodic table, or inorganic oxide composite particles of the metal elements:

Examples of the metal element include Be, Mg, Ca, Sr, Ba, Y, Ti, Zr, Zn, and Al. Particularly, oxides of Al, Mg, Y, and Zn are preferable because they are generally used and less costly and have high volume resistivity.

Specifically, at least one type of particles selected from the group consisting of $Al_2O_3$, MgO, $ZrO_2$, $Y_2O_3$, BeO, and $MgO.Al_2O_3$ is preferable in terms of the high volume resistivity.

Particularly, $Al_2O_3$ having a γ-crystal structure is preferable in terms of the large specific surface area and the good dispersibility to a resin.

Instead of or in addition to the inorganic oxide particles (B1), at least one type of the following inorganic oxide particles (B2) to (B5) may be used in the present invention as the inorganic oxide particles (B), provided that the inorganic oxide particles (B2) to (B5) are neither the above described inorganic oxide particles nor the inorganic oxide composite particles (B1).

(B2) An inorganic composite oxide particle represented by the formula (B2):

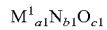

wherein $M^1$ is a metal element belonging to group 2 of the periodic table, N is a metal element belonging to group 4 of the periodic table, a1 is 0.9 to 1.1; b1 is 0.9 to 1.1, c1 is 2.8 to 3.2, and $M^1$ and N may be plural:

Preferable examples of the group 4 metal element include Ti and Zr. Preferable examples of the group 2 metal element include Mg, Ca, Sr, and Ba.

Specifically, at least one type of particles selected from the group consisting of $BaTiO_3$, $SrTiO_3$, $CaTiO_3$, $MgTiO_3$, $BaZrO_3$, $SrZrO_3$, $CaZrO_3$, and $MgZrO_3$ is preferable in terms of a high volume resistivity.

(B3) A composite oxide particle represented by the formula (B3):

$$M^2_{a2}M^3_{b2}O_{c2}$$

wherein $M^2$ and $M^3$ are different from each other, $M^2$ is a metal element belonging to group 2 of the periodic table, $M^3$ is a metal element belonging to group 5 of the periodic table, a2 is 0.9 to 1.1, b2 is 0.9 to 1.1, and c2 is 2.8 to 3.2:

Specific examples of the composite oxide (B3) include magnesium stannate, calcium stannate, strontium stannate, barium stannate, magnesium antimonate, calcium antimonate, strontium antimonate, barium antimonate, magnesium zirconate, calcium zirconate, strontium zirconate, barium zirconate, magnesium indate, calcium indate, strontium indate, and barium indate.

(B4) A composite oxide particle that includes at least three metal elements selected from the group consisting of metal elements belonging to groups 2 and 4 of the periodic table:

In the composite oxide (B4), specific examples of the metal elements belonging to group 2 of the periodic table include Be, Mg, Ca, Sr, and Ba, and specific examples of the metal elements belonging to group 4 of the periodic table include Ti, Zr, and Hf.

Preferable examples of the combination of the three or more metal elements selected from the group consisting of metal elements belonging to groups 2 and 4 of the periodic table include the combination of Sr, Ba, and Ti, the combination of Sr, Ti, and Zr, the combination of Sr, Ba, and Zr, the combination of Ba, Ti, and Zr, the combination of Sr, Ba, Ti, and Zr, the combination of Mg, Ti, and Zr, the combination of Ca, Ti, and Zr, the combination of Ca, Ba, and Ti, the combination of Ca, Ba, and Zr, the combination of Ca, Ba, Ti, and Zr, the combination of Ca, Sr, and Zr, the combination of Ca, Sr, Ti, and Zr, the combination of Mg, Sr, and Zr, the combination of Mg, Sr, Ti, and Zr, the combination of Mg, Ba, Ti, and Zr, and the combination of Mg, Ba, and Zr.

Specific examples of the composite oxide (B4) include strontium zirconate titanate, barium zirconate titanate, barium strontium zirconate titanate, magnesium zirconate titanate, calcium zirconate titanate, and barium calcium zirconate titanate.

(B5) An inorganic oxide composite particle (B5) of an oxide of one of metal elements belonging to groups 2, 3, 4, 12, and 13 of the periodic table and a silicon oxide:

The inorganic oxide composite particle (B5) is a composite particle of the inorganic oxide particle (B1) and a silicon oxide, and is specifically at least one type of a particle selected from the group consisting of $3Al_2O_3.2SiO_2$, $2MgO.SiO_2$, $ZrO_2.SiO_2$, and $MgO.SiO_2$.

In addition to these composite oxide particles, a composite oxide particle such as lead zirconate titanate, lead antimonate, zinc titanate, lead titanate, and titanium oxide may be used therewith.

In the present invention, the primary average particle size of the inorganic oxide particle (B) is preferably small. Particularly, a nano particle with a particle size of 1 µm or smaller is preferable. Uniform dispersion of such inorganic acid nano particles can remarkably improve electrical insulation of a film even if the amount of the particles is small. The primary average particle size is preferably 300 nm or smaller, more preferably 200 nm or smaller, and particularly preferably 100 nm or smaller. The minimum primary average particle size is not particularly limited, but is preferably 10 nm or greater in terms of difficulty in production, difficulty in uniform dispersion, and costs.

The primary average particle size is determined by BET equivalent.

The inorganic oxide particles (B) include particles not contributing to improvement in dielectric characteristics, such as the inorganic oxide particles (B1), and the ferroelectric inorganic oxide particles (B2) to (B5) (dielectric constant (1 kHz, 25° C.) is 100 or higher) that are blended for improving dielectric characteristics.

The inorganic oxide (B1) is used in order to improve electrical insulation and further volume resistivity, and therefore does not necessarily have high dielectric properties. Accordingly, even if particles of $Al_2O_3$, MgO, or the like are used as a generally used and less costly metal inorganic oxide particles (B1), volume resistivity can be improved. The metal inorganic oxide particles (B1) have a dielectric constant (1 kHz, 25° C.) of less than 100 and further 10 or less.

When the ferroelectric inorganic oxide particles (B2) to (B5) (dielectric constant (1 kHz, 25° C.) is 100 or higher) that are blended for improving dielectric characteristics are used, the amount thereof is reduced not to contribute to improvement in dielectric characteristics for improving electrical insulation and further volume resistivity. Further, in terms of a particle size, the inorganic oxide particle having a primary average particle size of 1 µm or smaller, which is hardly dispersed when used in great quantity, is effectively used.

Examples of an inorganic material constituting the ferroelectric inorganic oxide particles (B2) to (B5) include, but are not limited to, composite metal oxides, composites, solid solutions, and sol-gel materials thereof.

With respect to the amount of the inorganic oxide particles (B), in order to improve electrical insulation and further volume resistivity, the inorganic oxide particles (B1) are preferably used in an amount of 0.01 parts by mass or more and less than 20 parts by mass, based on 100 parts by mass of the film-forming resin (A). When 20 parts by mass or more of the particles (B1) is used, electrical insulation (voltage resistance) tends to decrease and the inorganic oxide particles (B1) may be less likely to be uniformly dispersed in the film-forming resin (A). The maximum amount of the particles (B1) is more preferably 8 parts by mass and still more preferably 6 parts by mass. Too small an amount of the particles (B1) provides no effect of improving electrical insulation. Therefore, the minimum amount of the particles (B1) is more preferably 0.1 parts by mass, still more preferably 0.5 parts by mass, and particularly preferably 1 part by mass.

In order to improve dielectric properties, the ferroelectric inorganic oxide particles (B2) to (B5) may be blended in relatively large amounts. For example, 10 parts by mass or more and 300 parts by mass or less of each of the particles may be blended based on 100 parts by mass of the film-forming resin (A).

(C) Other Optional Component

In the present invention, use of the specific film-forming resin (A) and the specific inorganic oxide particles (B) sufficiently improves the electrical insulation of a high dielectric film. Optionally, an additive such as a filler for reinforcement and an affinity improver may be added as long as the effects of the present invention are maintained.

The filler for reinforcement is a component that is added to give mechanical properties (tensile strength, hardness, and the like), and is a particle or a fiber other than the inorganic oxide particles (B). Examples of the filler for reinforcement include particles or fibers of silicon carbide, silicon nitride, and a boron compound. Silica (silicon oxide) may be blended as a process improver or a filler for reinforcement, but provides less insulation-improving effects than the inorganic oxide particles (B) because silica has low heat conductivity and remarkably low volume resistivity especially at high temperatures.

Examples of the affinity improver include compounds other than the film-forming resin (A), such as a functional group-modified polyolefin, a styrene-modified polyolefin, a functional group-modified polystyrene, a polyacrylic imide, and cumylphenol. The affinity improver may be added as long as the effects of the present invention are maintained. These components are more preferably excluded in terms of insulation improving effects.

The film for a film capacitor of the present invention may be formed into a film by extrusion, compression, or blowing.

For example, the method for forming a film by extrusion includes melting and kneading the film-forming resin (A), and if necessary the inorganic oxide particles (B) and the component (C), and extruding the mixture by a flat die. The method for forming a film by compression includes melting and kneading the film-forming resin (A), and if necessary the inorganic oxide particles (B) and the component (C) by a laboplasto mill or the like, and heating and compressing the mixture by heat pressing or the like. The method for forming a film by blowing includes melting and kneading the film-forming resin (A), and if necessary the inorganic oxide particles (B) and the component (C), and performing blown film extrusion.

The film for a film capacitor of the present invention may be prepared by applying a coating composition including the film-forming resin (A), and if necessary the inorganic oxide particles (B), the component (C), and a solvent (D) to make a film and peeling the film.

As the solvent (D) for preparing the coating composition, any solvent that dissolves the TFE resin (a1), and if necessary the fluorine-free resin (a2) may be used. A polar organic solvent is particularly preferable. Preferred examples of the polar organic solvent include ketone solvents, ester solvents, carbonate solvents, cyclic ether solvents, and amide solvents. Specific examples of the polar organic solvent include methyl ethyl ketone, methyl isobutyl ketone, acetone, diethyl ketone, dipropyl ketone, ethyl acetate, methyl acetate, propyl acetate, butyl acetate, ethyl lactate, dimethyl carbonate, diethyl carbonate, dipropyl carbonate, methyl ethyl carbonate, tetrahydrofuran, methyl tetrahydrofuran, dioxane, dimethylformamide, and dimethylacetamide.

In the coating composition, the concentration of solids of all the film-forming resin (A), the inorganic oxide particles (B), and the optional component (C) is preferably adjusted to 5 to 30% by mass using the solvent (D). Thus, the coating work is easily performed and the good stability of the composition is obtainable. The coating composition may be prepared by dissolving or dispersing these components in the solvent.

In the present invention, it is important to uniformly disperse the inorganic oxide particles (B) in the film-forming resin (A). In the present invention, since the amount of the inorganic oxide particles (B) is small, it is easy to relatively uniformly disperse the particles (B). Optionally, the affinity improver may be used or a surfactant may be added to the coating composition.

The surfactant may be a cationic, anionic, nonionic, or amphoteric surfactant as long as electrical insulation is maintained. Among these, a nonionic surfactant is preferable, and a polymeric nonionic surfactant is particularly preferable.

Examples of the polymeric nonionic surfactant include polyoxyethylene lauryl ether and sorbitan monostearate.

Examples of the coating method of the coating composition include knife coating method, cast coating method, roll coating method, gravure coating method, blade coating method, rod coating method, air doctor coating method, curtain coating method, fountain coating method, kiss coating method, screen coating method, spin coating method, spray coating method, extrusion coating method, and electrodeposition coating method. Among these, in terms of handleability, less variation of a film thickness, and excellent productivity, roll coating method, gravure coating method, and cast coating method are preferable, and cast coating method is particularly preferable. An excellent film for a film capacitor can be produced by such coating methods.

For example, a film obtained in such a way that the coating composition is cast on a surface of a substrate, dried, and removed from the substrate has high electrical insulation and is excellent in voltage resistance and flexibility due to its thinness.

The thus obtained film for a film capacitor of the present invention has a film thickness of 250 $\mu$m or smaller, preferably 200 $\mu$m or smaller, more preferably 100 $\mu$m or smaller, and particularly preferably 10 $\mu$m or smaller. The minimum film thickness is preferably about 2 $\mu$m in terms of maintaining of mechanical strength.

The present invention also relates to a film capacitor including the film for a film capacitor of the present invention and an electrode layer disposed on at least one surface of the film for a film capacitor.

Examples of the structure of the film capacitor include a laminate structure in which an electrode layer and a high dielectric film are interlaminated (JP-A 63-181411, JP-A 3-18113, and the like) and a winding structure that is a roll of a high dielectric film tape and an electrode layer (one disclosed in JP-A 60-262414 in which an electrode disposed on a high dielectric film is discontinuous or one disclosed in JP-A 3-286514 in which an electrode disposed on a high dielectric film is continuous). A winding film capacitor having a high dielectric film on which an electrode layer is continuously disposed has a simple structure and is relatively easily produced. Such a winding film capacitor is generally produced in such a way that a laminate of two high dielectric films each of which has an electrode disposed on at least one surface thereof is wound while avoiding contact between the electrodes. If necessary, the two films are fixed with each other not to loosen after winding.

The electrode layer is a layer of a conductive metal such as, but not particularly limited to, aluminum, zinc, gold, platinum, and copper. The electrode layer is used as a metallic foil or a deposited metal coating. In the present invention, a metallic foil and a deposited metal may be used or they may be used in combination. The deposited metal coating is generally preferable because it can be formed in a thin electrode layer and as a result, the capacity can be increased relative to the volume, the adhesion to a dielectric substance is improved, and the coating has less variation in film thickness. The deposited metal coating may be a single layer coating or optionally a multilayer coating. For example, an electrode layer may be prepared by forming a semiconductive aluminum oxide layer on an aluminum layer in order to give moisture resistance (for example, JP-A 2-250306 and the like). The thickness of the deposited metal coating is not particularly limited and preferably 100 to 2,000 angstroms and more preferably 200 to 1,000 angstroms. In the case that the thickness of the deposited metal coating is within the range, the capacity and intensity of the capacitor is well-balanced.

The deposited metal coating used as an electrode layer may be formed by any method. Examples of the method include vacuum deposition, sputtering, and ion plating. Vacuum deposition is usually used.

The vacuum deposition is batchwise for a formed product, or semicontinuously or continuously (air to air) carried out for a long product, and is now mainly semicontinuously carried out. The semicontinuous metal deposition is a method including metal deposition in a vacuum, winding the resulting film, and taking out the deposited film after the vacuum is returned to atmospheric pressure.

Specifically, the semicontinuous metal deposition may be carried out in accordance with the method disclosed in JP-B 3664342 with reference to FIG. 1.

When a metal thin film layer is formed on the film for a film capacitor, the film surface may be pretreated by corona treatment, plasma treatment, and the like for improving adhesion. The thickness of the metallic foil used as an electrode layer is also not particularly limited, and usually 0.1 to 100 µm, preferably 1 to 50 and more preferably 3 to 15 µm.

Films may be fixed by any method. For example, the films are sealed with a resin or closed in an insulating case. Thus, the films are fixed and simultaneously the structure is protected. A lead wire may be connected by any method. For example, the lead wire may be welded, ultrasonic welding, hot-pressure welded, or fixed with an adhesive tape. The lead wire may be connected to an electrode before winding. When, for example, the films are closed in an insulating case, an opening and the like may be optionally sealed with a thermosetting resin such as an urethane resin and an epoxy resin to prevent oxidation deterioration.

The thus obtained film capacitor of the present invention has improved electrical insulation, especially improved electrical properties at high temperatures while maintaining high dielectric properties.

EXAMPLES

The present invention is explained based on examples, but is not limited thereto.

Characteristic values used herein were determined by the following methods except for those described above.
(Copolymer Composition)

A copolymer composition is suitably determined by $^{19}$F-NMR analysis, or may be optionally determined by the combination of $^{19}$F-NMR analysis and elemental analysis. The $^{19}$F-NMR analysis is performed using an NMR instrument (Bruker BioSpin K.K.) at a measurement temperature of the melting point of a polymer+20° C.
(Film Thickness)

The thickness of a film disposed on a substrate is measured using a digital measuring instrument (MF-1001, product of Sendai Nikon corporation) at room temperature.
(Dielectric Loss Tangent and Dielectric Constant)

A sample is prepared by aluminum deposition on both surfaces of a composite film in a vacuum. The sample is examined for electrostatic capacity and a dielectric loss tangent using an impedance analyzer (HP4194A, product of Hewlett-Packard Company) at 30° C. and 90° C. at a frequency of 100 Hz, 1 kHz, and 10 kHz. A dielectric constant is determined from the resulting electrostatic capacity.
(Volume Resistivity)

Volume resistivity (Ω·cm) is measured using a digital super megohmmeter/microammeter at 90° C. and 300 V DC under a dry air atmosphere.

Synthesis Example 1

Production of TFE Resin A

A 174-L autoclave was charged with distilled water (51.0 L), and sufficiently purged with nitrogen. Then, perfluorocyclobutane (55.0 kg) was fed thereto, and the temperature in the system and agitation speed were maintained at 35° C. and 200 rpm, respectively. Next, $CH_2=CHCF_2CF_2CF_2CF_2CF_2CF_3$ (13 g), TFE (4.97 kg), and VDF (1.37 kg) were sequentially added, and a methanol solution (140 g) of 50% by mass of di-n-propyl peroxydicarbonate (NPP) as a polymerization initiator was added to initiate polymerization. Ethyl acetate (156 g) was also added to the mixture at the initiation of polymerization. Since the pressure in the system decreased with the progress of polymerization, a TFE/VDF gaseous monomer mixture (TFE/VDF=60.2/39.8 (mol % ratio)) and $CH_2=CHCF_2CF_2CF_2CF_2CF_2CF_3$ were simultaneously added to maintain the pressure in the system at 0.8 MPa. The amount of $CH_2=CHCF_2CF_2CF_2CF_2CF_2CF_3$ added was 1.21 parts by mass based on 100 parts by mass of the gaseous monomer mixture added. Finally, the polymerization was terminated when the amount of the added gaseous monomer mixture reached 11 kg. The pressure was reduced to atmospheric pressure, and the resulting TFE/VDF/$CH_2=CHCF_2CF_2CF_2CF_2CF_2CF_3$ copolymer was rinsed with water and dried. Thus, 10.4 kg of powder was prepared.

Next, the powder was melt-kneaded and formed into pellets using a single-screw extruder (φ 20 mm) at a cylinder temperature of 290° C. The resulting pellets were heated at 150° C. for 12 hours.

The composition and physical properties of the pellets were as follows.
TFE/VDF/$CH_2=CHCF_2CF_2CF_2CF_2CF_2CF_3$: 60.1/39.6/0.3 (mol % ratio)
Melting point: 218° C.
MFR: 1.7 g/10 min (297° C., 5 kg)
Storage modulus (E') at 170° C.: 153 MPa
Thermal decomposition onset temperature (1% by mass loss temperature): 372° C.

Synthesis Example 2

Production of TFE Resin B

A 174-L autoclave was charged with distilled water (52.2 L), and sufficiently purged with nitrogen. Then, perfluorocyclobutane (39.1 kg) was fed thereto, and the temperature in the system and agitation speed were maintained at 35° C. and 200 rpm, respectively. Next, perfluoro(propyl)vinyl ether ($CF_2=CF-OCF_2CF_2CF_3$) (0.34 kg), TFE (6.00 kg), and VDF (1.08 kg) were sequentially added, and a methanol solution (130 g) of 50% by mass of di-n-propyl peroxydicarbonate (NPP) as a polymerization initiator was added to initiate polymerization. Ethyl acetate (0.3 kg) was also added to the mixture at the initiation of polymerization. Since the pressure in the system decreased with the progress of polymerization, a TFE/VDF gaseous monomer mixture (TFE/VDF=65.5/34.5 (mol % ratio)) and perfluoro(propyl)vinyl ether were simultaneously added to maintain the pressure in the system at 0.9 MPa. The amount of perfluoro(propyl)vinyl ether added was 0.9 parts by mass based on 100 parts by mass of the gaseous monomer mixture added. Finally, the polymerization was terminated when the amount of the added gaseous monomer mixture reached 8 kg. The pressure was reduced to atmospheric pressure, and the resulting TFE/VDF/perfluoro (propyl)vinyl ether copolymer was rinsed with water and dried. Thus, 7.5 kg of powder was prepared.

Next, the powder was melt-kneaded and formed into pellets using a single-screw extruder (φ 20 mm) at a cylinder temperature of 280° C. The resulting pellets were heated at 150° C. for 12 hours.

The composition and physical properties of the pellets were as follows.
TFE/VDF/perfluoro(propyl)vinyl ether: 65.5/34.3/0.2 (mol % ratio)
Melting point: 228° C.
MFR: 1.6 g/10 min (297° C., 5 kg)
Storage modulus (E') at 170° C.: 87 MPa
Thermal decomposition onset temperature (1% by mass loss temperature): 383° C.

Synthesis Example 3

Production of TFE resin C

A 174-L autoclave was charged with distilled water (51.0 L), and sufficiently purged with nitrogen. Then, perfluorocyclobutane (55.0 kg) was fed thereto, and the temperature in the system and agitation speed were maintained at 35° C. and 200 rpm, respectively. Next, $CH_2=CHCF_2CF_2CF_2CF_2CF_2CF_3$ (9 g), perfluoro(propyl)vinyl ether (60 g), TFE (4.99 kg), and VDF (1.37 kg) were sequentially added, and a methanol solution (140 g) of 50% by mass of di-n-propyl peroxydicarbonate (NPP) as a polymerization initiator was added to initiate polymerization. Ethyl acetate (140 g) was also added to the mixture at the initiation of polymerization. Since the pressure in the system decreased with the progress of polymerization, a TFE/VDF gaseous monomer mixture (TFE/VDF=60.0/40.0 (mol % ratio)), $CH_2=CHCF_2CF_2CF_2CF_2CF_2CF_3$ and perfluoro(propyl)vinyl ether were simultaneously added to maintain the pressure in the system at 0.8 MPa. The amounts of $CH_2=CHCF_2CF_2CF_2CF_2CF_2CF_3$ and perfluoro(propyl)vinyl ether added were 0.8 parts and 0.3 parts, respectively, based on 100 parts by mass of the gaseous monomer mixture added. Finally, the polymerization was terminated when the amount of the added gaseous monomer mixture reached 9 kg. The pressure was reduced to atmospheric pressure, and the resulting TFE/VDF/$CH_2=CHCF_2CF_2CF_2CF_2CF_2CF_3$/perfluoro(propyl)vinyl ether copolymer was rinsed with water and dried. Thus, 8.6 kg of powder was prepared.

Next, the powder was melt-kneaded and formed into pellets using a single-screw extruder (φ 20 mm) at a cylinder temperature of 290° C. The resulting pellets were heated at 150° C. for 12 hours.

The composition and physical properties of the pellets were as follows.
TFE/VDF/$CH_2=CHCF_2CF_2CF_2CF_2CF_2CF_3$/perfluoro(propyl)vinyl ether: 59.8/39.9/0.2/0.1 (mol % ratio)
Melting point: 221° C.
MFR: 1.8 g/10 min (297° C., 5 kg)
Storage modulus (E') at 170° C.: 123 MPa
Thermal decomposition onset temperature (1% by mass loss temperature): 377° C.

Example 1

The pellet resin resulting from Synthesis Example 1 was heat-pressed at 250° C. to be formed into a film with a thickness of 207 μm.

Example 2

The pellet resin resulting from Synthesis Example 2 was heat-pressed at 250° C. to be formed into a film with a thickness of 201 μm.

Example 3

The pellet resin resulting from Synthesis Example 3 was heat-pressed at 250° C. to be formed into a film with a thickness of 202 μm.

Example 4

The pellet resin (100 parts by mass) resulting from Synthesis Example 1 and alumina (primary average particle size of 100 nm) (10 parts by mass) were mixed and kneaded at 250° C. The mixture was heat-pressed at 250° C. to be formed into a film with a thickness of 210 μm.

Example 5

The pellet resin (100 parts by mass) resulting from Synthesis Example 1 and barium titanate (primary average particle size of 100 nm) (20 parts by mass) were mixed and kneaded at 250° C. The mixture was heat-pressed at 250° C. to be formed into a film with a thickness of 215 μm.

Comparative Example 1

A film for a film capacitor for comparison was prepared similarly to Example 1 except that a VDF homopolymer (Neo-Flon VDF, VP-832, product of Daikin Industries, LTD.) was used as the film-forming resin.

The resulting films were examined for a dielectric loss tangent, a dielectric constant, and volume resistivity. Table 1 shows the results.

TABLE 1

| | Example | | | | | Comparative Example |
|---|---|---|---|---|---|---|
| | 1 | 2 | 3 | 4 | 5 | 1 |
| (A) Film-forming resin (part by mass) | 100 | 100 | 100 | 100 | 100 | 100 |
| Molar ratio (%) | | | | | | |
| VDF | 39.6 | 34.3 | 39.9 | 39.6 | 39.6 | 100 |
| TFE | 60.1 | 65.5 | 59.8 | 60.1 | 60.1 | — |
| $CH_2=CHCF_2CF_2CF_2CF_2CF_2CF_3$ | 0.3 | — | 0.2 | 0.3 | 0.3 | — |
| $CF_2=CF-OCF_2CF_2CF_3$ | — | 0.2 | 0.1 | — | — | — |

TABLE 1-continued

|  | Example | | | | | Comparative Example |
|---|---|---|---|---|---|---|
|  | 1 | 2 | 3 | 4 | 5 | 1 |
| (B) Inorganic oxide particle (part by mass) | | | | | | |
| $Al_2O_3$ | — | — | — | 10 | — | — |
| $BaTiO_3$ | — | — | — | — | 20 | — |
| Film characteristics | | | | | | |
| Film thickness (μm) | 207 | 201 | 202 | 210 | 215 | 200 |
| Volume resistivity (Ω·cm) | $4 \times 10^{13}$ | $3 \times 10^{13}$ | $4 \times 10^{13}$ | $1 \times 10^{14}$ | $3 \times 10^{13}$ | $2.5 \times 10^{13}$ |
| Measurement temperature (° C.) | 30° C.   90° C. | 30° C.   90° C. | 30° C.   90° C. | 30° C.   90° C. | 30° C.   90° C. | 30° C.   90° C. |
| Dielectric constant | | | | | | |
| 100 Hz | 8.9   10.2 | 8.6   9.9 | 9.1   10.4 | 8.5   9.8 | 11.8   13.7 | 11.2   14.3 |
| 1 kHz | 8.7   9.5 | 8.4   9.4 | 8.8   9.7 | 8.2   9.2 | 11.7   12.8 | 10.6   13.5 |
| 10 kHz | 8.5   9.0 | 8.2   8.8 | 8.5   9.1 | 8.1   8.7 | 11.3   11.6 | 10.1   13.0 |
| Dielectric loss tangent (%) | | | | | | |
| 100 Hz | 1.8   6.0 | 1.6   5.5 | 1.9   6.2 | 1.7   5.7 | 1.6   5.4 | 6.2   6.8 |
| 1 kHz | 1.7   4.3 | 1.5   3.9 | 1.8   4.3 | 1.7   4.2 | 1.6   4.0 | 3.3   9.9 |
| 10 kHz | 1.6   3.7 | 1.5   3.2 | 1.7   3.8 | 1.6   3.6 | 1.5   3.5 | 3.1   8.7 |

Table 1 shows that, in the resins of the present invention, the dielectric loss tangent was particularly improved to be low and frequency dependency was also low.

Example 6

Aluminum was vapor-deposited on both surfaces of the film produced in Example 1 using vacuum deposition equipment (VE-2030, product of VACUUM DEVICE INC.) to make an electrode have a surface resistivity of 30/sq. A lead wire for voltage application was attached to the aluminum electrodes to prepare a stamp-type film capacitor (for simple evaluation).

The invention claimed is:

1. A film for a film capacitor comprising
a tetrafluoroethylene resin (a1) that comprises a vinylidene fluoride unit and a tetrafluoroethylene unit in the vinylidene fluoride unit/tetrafluoroethylene unit (mol % ratio) of 5/95 to 49/51 as a film-forming resin (A) and,
the tetrafluoroethylene resin (a1) further comprises an ethylenically unsaturated monomeric unit, and
the tetrafluoroethylene resin (a1) is
a tetrafluoroethylene (TFE) - vinylidene fluoride (VDF) resin (a1-1) that consists of 55.0 to 90.0 mol % of the tetrafluoroethylene unit, 5.0 to 44.9 mol % of the vinylidene fluoride unit, and 0.1 to 10.0 mol % of the ethylenically unsaturated monomeric unit represented by the formula (1):

$$CX^1X^2=CX^3(CF_2)_nX^4$$

wherein $X^1$, $X^2$, $X^3$, and $X^4$ are the same as or different from one another, and are each represent H, F, or Cl; and n is an integer of 0 to 8, provided that compounds of the formula (1) are neither tetrafluoroethylene nor vinylidene fluoride,
a tetrafluoroethylene (TFE)-vinylidene fluoride (VDF) resin (a1-2) that consists of 55.0 to 90.0 mol % of the tetrafluoroethylene unit, 9.2 to 44.2 mol % of the vinylidene fluoride unit, and 0.1 to 0.8 mol % of the ethylenically unsaturated monomeric unit represented by the formula (2):

$$CF_2=CF—ORf^1$$

wherein $Rf^1$ is a C1-C3 alkyl group or a C1-C3 fluoroalkyl group, or
a tetrafluoroethylene (TFE)-vinylidene fluoride (VDF) resin (a1-3) that consists of 55.0 to 90.0 mol % of the tetrafluoroethylene unit; 5.0 to 44.8 mol % of the vinylidene fluoride unit; 0.1 to 10.0 mol % of the ethylenically unsaturated monomeric unit represented by the formula (1):

$$CX^1X^2=CX^3(CF_2)_nX^4$$

wherein $X^1$, $X^2$, $X^3$, and $X^4$ are the same as or different from one another, and are each represent H, F, or Cl; and n is an integer of 0 to 8, provided that compounds of the formula (1) are neither tetrafluoroethylene nor vinylidene fluoride; and 0.1 to 0.8 mol % of the ethylenically unsaturated monomeric unit represented by the formula (2):

$$CF_2=CF—ORf^1$$

wherein $Rf^1$ is a C1-C3 alkyl group or a C1-C3 fluoroalkyl group.

2. The film for a film capacitor according to claim 1, wherein the tetrafluoroethylene resin (a1) has a storage modulus (E') of 60 to 400 MPa at 170° C. determined by dynamic viscoelasticity measurement.

3. The film for a film capacitor according to claim 1, wherein the film-forming resin (A) comprises the tetrafluoroethylene resin (a1) and a fluorine-free resin (a2).

4. The film for a film capacitor according to claim 3, wherein the fluorine-free resin (a2) is at least one selected from the group consisting of cellulose resins and acrylic resins.

5. The film for a film capacitor according to claim 1 further comprising inorganic oxide particles (B).

6. The film for a film capacitor according to claim 5, wherein the inorganic oxide particles (B) comprises at least (B1) inorganic oxide particles of one of metal elements belonging to groups 2, 3, 4, 12, and 13 of the periodic table or inorganic oxide composite particles of the metal elements.

7. The film for a film capacitor according to claim 6, wherein the inorganic oxide particles or the inorganic oxide composite particles (B1) are at least one type of particles selected from the group consisting of $Al_2O_3$, MgO, $ZrO_2$, $Y_2O_3$, BeO, and $MgO \cdot Al_2O_3$.

8. The film for a film capacitor according to claim 6, wherein the inorganic oxide particles or the inorganic oxide composite particles (B1) are particles of $\gamma$-$Al_2O_3$.

9. The film for a film capacitor according to claim 5, wherein the inorganic oxide particles (B) comprise at least one type of high dielectric inorganic particles selected from the group consisting of composite oxide particles (B2) to (B5), provided that the high dielectric inorganic particles are neither the inorganic oxide particles nor the inorganic oxide composite particles (B1), each of the composite oxide particles (B2) being represented by the formula (B2):

$$M^1_{a1}N_{b1}O_{c1}$$

wherein $M^1$ is a metal element belonging to group 2 of the periodic table, N is a metal element belonging to group 4 of the periodic table, a1 is 0.9 to 1.1; b1 is 0.9 to 1.1, c1 is 2.8 to 3.2, and $M^1$ and N may be plural;

each of the composite oxide particles (B3) being represented by the formula (B3):

$$M^2_{a2}M^3_{b2}O_{c2}$$

wherein $M^2$ and $M^3$ are different from each other, $M^2$ is a metal element belonging to group 2 of the periodic table, $M^3$ is a metal element belonging to group 5 of the periodic table, a2 is 0.9 to 1.1, b2 is 0.9 to 1.1, and c2 is 2.8 to 3.2;

each of the composite oxide particles (B4) including at least three metal elements selected from the group consisting of metal elements belonging to groups 2 and 4 of the periodic table; and each of the inorganic oxide composite particles (B5) being a composite particle of an oxide of one of metal elements belonging to groups 2, 3, 4, 12, and 13 of the periodic table and a silicon oxide.

10. A film capacitor comprising:
the film for a film capacitor according to claim 1; and
an electrode layer disposed on at least one surface of the film for a film capacitor.

* * * * *